United States Patent
Rae et al.

(10) Patent No.: US 9,050,831 B2
(45) Date of Patent: Jun. 9, 2015

(54) INK CURING APPARATUS WITH LAMP HOUSING AND MOVABLE LOCKING MEMBER

(71) Applicant: GEW (EC) LIMITED, Redhill Surrey (GB)

(72) Inventors: Malcolm Rae, Redhill Surrey (GB); James Hicks, Redhill Surrey (GB)

(73) Assignee: ABERYSTWYTH UNIVERSITY, Aberystwyth (GB)

( * ) Notice: Subject to any disclaimer, the term of this patent is extended or adjusted under 35 U.S.C. 154(b) by 3 days.

(21) Appl. No.: 14/352,558

(22) PCT Filed: Jun. 28, 2013

(86) PCT No.: PCT/GB2013/051714
§ 371 (c)(1),
(2) Date: Apr. 17, 2014

(87) PCT Pub. No.: WO2014/006376
PCT Pub. Date: Jan. 9, 2014

(65) Prior Publication Data
US 2014/0267522 A1    Sep. 18, 2014

(30) Foreign Application Priority Data
Jul. 2, 2012   (GB) .................................. 1211677.8

(51) Int. Cl.
| | |
|---|---|
| B41J 2/01 | (2006.01) |
| B41J 11/00 | (2006.01) |
| F21V 19/00 | (2006.01) |
| F26B 3/28 | (2006.01) |
| F21V 19/04 | (2006.01) |
| B41F 23/04 | (2006.01) |
| F21V 21/14 | (2006.01) |
| C09D 11/101 | (2014.01) |
| H01R 13/639 | (2006.01) |

(52) U.S. Cl.
CPC .............. *B41J 11/0015* (2013.01); *F21V 21/14* (2013.01); *F21V 19/008* (2013.01); *B41J 11/002* (2013.01); *C09D 11/101* (2013.01); *F26B 3/28* (2013.01); *F21V 19/04* (2013.01); *H01R 13/639* (2013.01); *B41F 23/0409* (2013.10); *B41F 23/0453* (2013.01)

(58) Field of Classification Search
USPC .................................................. 347/102, 103
See application file for complete search history.

(56) References Cited

U.S. PATENT DOCUMENTS

| | | | |
|---|---|---|---|
| 1,903,127 A | | 3/1933 | O'Rourke |
| 2,569,662 A | * | 10/1951 | Fallek ........................... 439/232 |
| 3,143,629 A | | 8/1964 | Appel et al. |
| 3,633,149 A | | 1/1972 | Maltais |

(Continued)

FOREIGN PATENT DOCUMENTS

| | | |
|---|---|---|
| EP | 1760395 A1 | 3/2007 |
| EP | 2149747 A1 | 2/2010 |

(Continued)

*Primary Examiner* — Julian Huffman
*Assistant Examiner* — Leonard S Liang
(74) *Attorney, Agent, or Firm* — Nixon Peabody LLP

(57) ABSTRACT

A lamp housing (1) for an ink curing apparatus comprising at least one locking member (18) configured to lock a lamp (3) into the housing (1) wherein the locking member (18) is movable between an open position allowing removal of the lamp (3) and a closed position restricting vertical movement of the lamp (3).

17 Claims, 5 Drawing Sheets

(56) References Cited

U.S. PATENT DOCUMENTS

| | | | |
|---|---|---|---|
| 3,697,743 A * | 10/1972 | Eargle | 362/260 |
| 3,723,945 A * | 3/1973 | Detch | 439/233 |
| 3,788,560 A * | 1/1974 | Hough et al. | 362/217.11 |
| 3,790,774 A * | 2/1974 | Miller et al. | 362/220 |
| 3,991,905 A * | 11/1976 | Nicpon | 362/260 |
| 4,277,820 A * | 7/1981 | Bostonian | 362/223 |
| 4,282,564 A * | 8/1981 | McJunkin Jr. et al. | 362/311.06 |
| 4,498,126 A * | 2/1985 | Hernandez | 362/220 |
| 4,538,217 A * | 8/1985 | Ewing et al. | 362/375 |
| 4,587,602 A * | 5/1986 | Dean et al. | 362/375 |
| 5,060,125 A | 10/1991 | Cowie et al. | |
| 5,132,885 A * | 7/1992 | Hocheim et al. | 362/220 |
| 5,282,755 A * | 2/1994 | Ahlstone | 439/233 |
| 5,387,800 A | 2/1995 | Kurtich et al. | |
| 5,461,554 A | 10/1995 | Leonetti et al. | |
| 5,741,063 A * | 4/1998 | Yeung | 362/427 |
| 6,231,213 B1 | 5/2001 | Schmidt et al. | 362/374 |
| 6,231,214 B1 * | 5/2001 | Haugaard | 362/375 |
| 6,905,230 B2 | 6/2005 | Schmitkons | |
| 7,465,063 B2 * | 12/2008 | Stillman | 362/225 |
| 7,549,787 B1 * | 6/2009 | Blaymore | 362/655 |
| 7,628,627 B2 * | 12/2009 | Lee et al. | 439/232 |
| 7,635,198 B2 * | 12/2009 | Mayfield et al. | 362/220 |
| 7,854,530 B2 * | 12/2010 | Wu et al. | 362/206 |
| 8,319,433 B2 * | 11/2012 | Lin et al. | 315/77 |
| 8,523,381 B1 * | 9/2013 | Clements et al. | 362/217.1 |
| 8,529,080 B2 | 9/2013 | Ahn | |
| 8,596,851 B2 * | 12/2013 | Ko et al. | 362/614 |
| 8,740,405 B2 * | 6/2014 | Yamazaki | 362/223 |
| 8,801,214 B2 * | 8/2014 | Chrysanthous | 362/191 |
| 8,956,013 B1 * | 2/2015 | Shew | 362/249.02 |
| 2006/0018116 A1 * | 1/2006 | Plunk et al. | 362/217 |
| 2006/0262547 A1 * | 11/2006 | Strobl et al. | 362/408 |
| 2007/0274067 A1 * | 11/2007 | Sloan et al. | 362/219 |
| 2008/0068831 A1 * | 3/2008 | Wilson et al. | 362/147 |
| 2008/0068835 A1 | 3/2008 | Ahn | |
| 2009/0314966 A1 * | 12/2009 | Garcia | 250/504 H |
| 2010/0053947 A1 * | 3/2010 | Fowler, Jr. et al. | 362/223 |
| 2010/0091484 A1 * | 4/2010 | Mayfield et al. | 362/223 |
| 2010/0308731 A1 * | 12/2010 | Mo | 315/112 |
| 2011/0012372 A1 * | 1/2011 | Presley et al. | 292/92 |
| 2012/0306342 A1 * | 12/2012 | Dellian et al. | 313/46 |
| 2013/0235568 A1 * | 9/2013 | Green et al. | 362/218 |

FOREIGN PATENT DOCUMENTS

| | | | |
|---|---|---|---|
| GB | 1427419 A * | 3/1976 | F21S 3/02 |
| WO | 2011/114098 A1 | 9/2011 | |

\* cited by examiner

INK CURING APPARATUS WITH LAMP HOUSING AND MOVABLE LOCKING MEMBER

CROSS REFERENCE TO RELATED APPLICATIONS

This application is a 35 U.S.C. §371 National Stage Application of International Application No. PCT/GB2013/051714, filed Jun. 28, 2013, which designates the United States, and which claims the contents which are herein incorporated by reference in their entireties.

The present invention relates to an ink curing apparatus and more specifically to the housing for an ultra violet (UV) lamp used for UV printing.

Ink curing apparatus comprising a housing containing a lamp partially surrounded by reflectors to direct UV radiation onto a substrate to cure ink are well-known. The UV lamps used in ink curing apparatus generally comprise a glass tube with an electrode extending into each end of the lamp tube. In some apparatus the lamp tube comprises a terminal assembly at each end, which is pinch sealed and received within a ceramic block into which the free end of each electrode extends. The lamp terminal is then connected to the housing using a threaded screw clamped with a nut. In alternative apparatus, the lamp comprises a plug at each of its ends, which allows the lamp to be removable connected to sockets in the lamp housing. The lamp is connected to the housing by "plugging" the lamp into the housing and removed by "unplugging" the lamp.

During use, a UV lamp emits heat at around 750° C. and a significant amount of heat is generated during curing and is retained even after the power is switched off. Therefore, it is important that the UV lamp is securely fixed to the housing. In addition to any plug/socket connection, the lamp is often also secured to the housing using a lamp plate or other similar fixing which is screwed onto an "end plate" of the lamp housing. To allow the lamp to be removed from the housing requires a user to unscrew the plate or fixing, before the lamp head can be "unplugged" or unscrewed. This requires the use of additional tools, which increases the time and complexity of replacing lamps. The difficulty in replacing the lamp adds to the time and cost of maintenance. Furthermore, the lamp head is often hot due to the high operating temperatures, so an increase in the time needed to change the lamp also increases the safety risk that occurs when the lamp is changed.

The present invention sets out to provide an improved housing for an ink curing apparatus, which alleviates the problems described above to provide for safer and quicker lamp maintenance.

In one aspect, the invention provides a lamp housing for an ink curing apparatus comprising at least one locking member configured to lock a lamp into the housing wherein the locking member is movable between an open position allowing removal of the lamp and a closed position restricting vertical movement of the lamp.

By allowing the lamp to be rapidly and conveniently connected to and disconnected from the apparatus, the cost and time involved in maintaining the apparatus is reduced. This improvement significantly improves the efficiency of on-site maintenance of ink curing apparatus.

It is to be understood that vertical movement of the lamp refers to movement perpendicular to the length of the lamp and perpendicular to a susbtrate placed under the lamp, in use.

Preferably, the locking member is hand-operable to move the locking member between an open and closed position.

Preferably, the locking member comprises a hinged portion rotatable about a locking pin.

Preferably, the locking pin is a threaded screw.

Preferably, the locking pin is a knurled threaded screw.

A knurled threaded screw improves the operability of the locking member by ensuring that a user can easily and safely grip the locking pin.

Optionally, the locking member is resiliently biased.

Preferably, the locking member comprises a tab, which abuts an end plate of the lamp housing.

More preferably, the tab is slideable into an end plate of the lamp housing.

A tab abutting an end plate of the lamp housing serves as a detent to prevent any accidental movement of the locking member.

Preferably, the locking member is a door provided in a door plate.

Preferably, the door plate comprises an aperture for accommodating a plug/socket connection means of a lamp.

Preferably, the door is moveable between an open position allowing removal of the lamp and a closed position restricting vertical movement of the lamp.

Preferably, when the door is in an open position, the door is parallel to the length of the housing such that, in use, it will not obstruct or pass across a plug/socket connection means of a lamp inserted into the housing.

Preferably, the door is moveable about a hinge.

Preferably, the hinge comprises a locking pin.

Preferably, the locking pin is a threaded screw.

Preferably, the locking pin is a knurled threaded screw.

Preferably, the lamp door is bordered by the door plate such that the major faces of the lamp door are co-planar with the door plate.

Preferably, in a closed position, the lamp door abuts a detent or groove in the door plate.

Preferably, at least part of the lamp door rests within a groove in the door plate, said groove restricting movement of the lamp door between a closed and open position.

Preferably, at least part of the lamp door is slideably mounted within the groove.

Preferably, sliding movement of the lamp door out of the door plate is restricted, preferably by a locking pin.

Preferably, removal of the locking pin permits sliding movement of the lamp door out of the door plate.

Preferably, the lamp door must be slid out of the groove to allow movement between a closed and an open position.

Preferably, the locking pin is configured such that if it is not correctly positioned, insertion of the lamp housing into a cassette housing of a print curing apparatus prior to use is prevented.

For the purposes of clarity and a concise description, features are described herein as part of the same or separate embodiments; however it will be appreciated that the scope of the invention may include embodiments having combinations of all or some of the features described.

The invention will now be described by way of example with reference to the accompanying diagrammatic drawings, in which.

Figure 1:
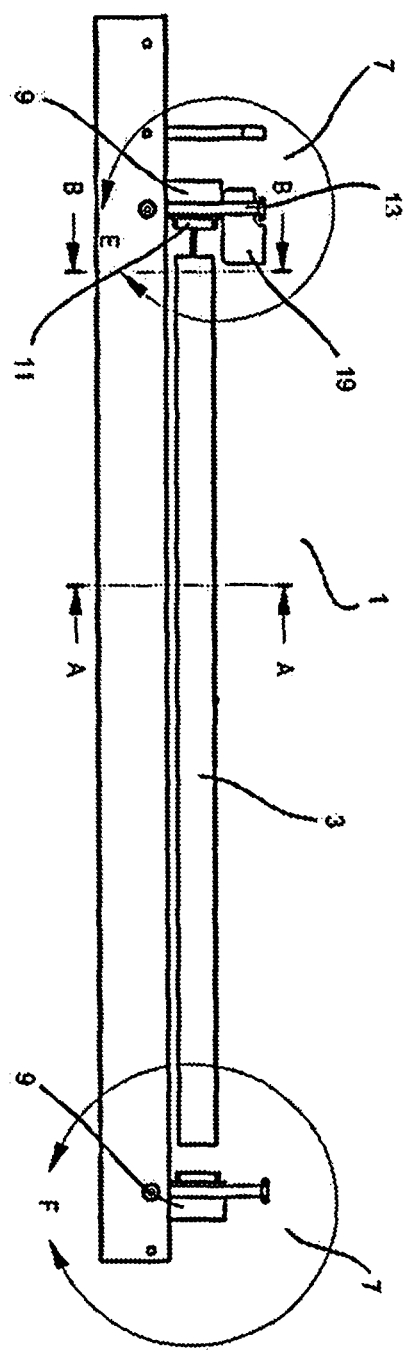
FIG. 1 is a side view of the ink curing apparatus constructed in accordance with the present invention, referring to the cross-sectional views shown in FIGS. 6 and 9.
Figure 2:
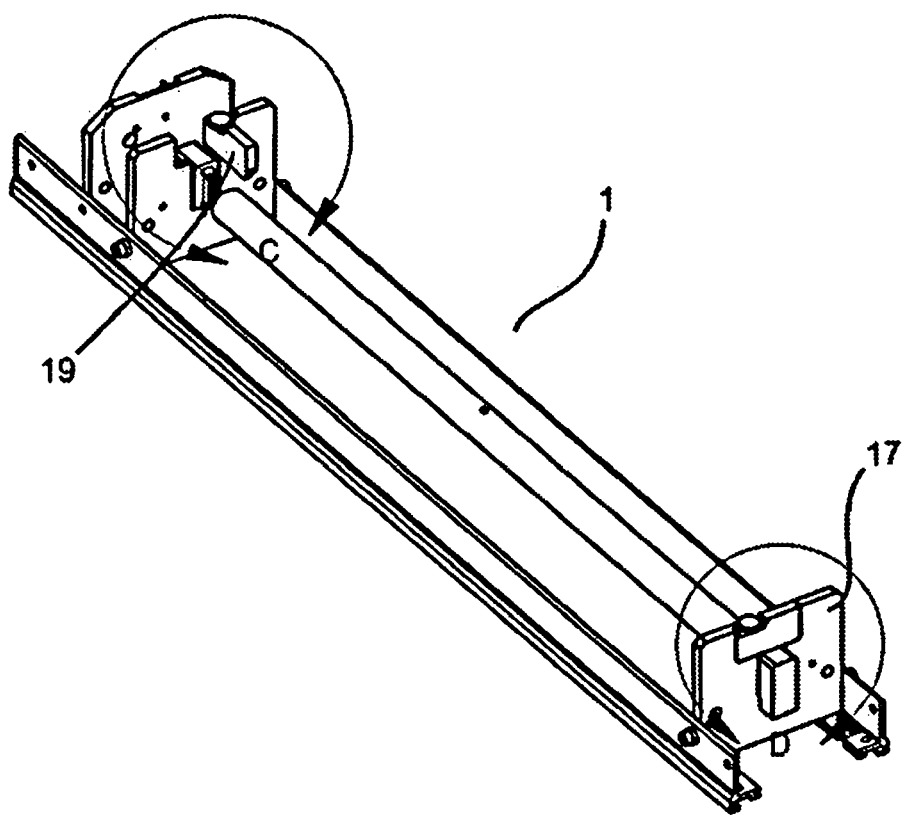
FIG. 2 is a perspective view of the-ink curing apparatus.

Referring to FIGS. 1 and 2, the ink curing apparatus comprises a lamp housing 1, which is an interchangeable "cassette" for use in ultra violet (UV) print curing. The lamp housing 1 houses a rod-shaped lamp 3 (shown in FIG. 1) surrounded by two reflectors 5. The lamp 3 emits UV radiation when a power supply is connected to the lamp head 7. Each reflector 5 is held in place by an extruded shutter 6. The extruded shutter 6 is hinged and is moveable between an open/use position exposing the lamp 3, as shown in FIG. 2, and a closed/stand-by position concealing the lamp (not shown). In use the apparatus allows a "curing aperture" to be defined between the reflectors 5. A substrate for UV print curing is positioned, in use, beneath the apparatus and is exposed to UV radiation emitted by the lamp 3 and focussed by the reflectors 5 through the curing aperture.

Figure 3:
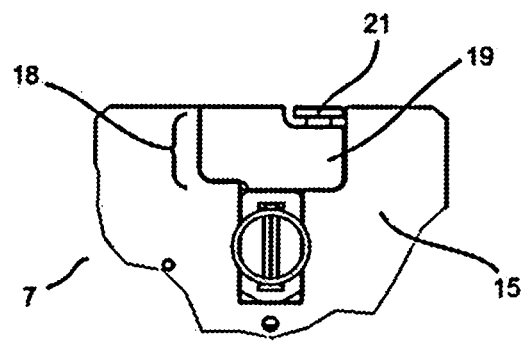
FIG. 3 is a detailed view from one end of the lamp door plate of the housing of an ink curing apparatus constructed in accordance with the present invention, showing a lamp door in closed position.
Figure 4:
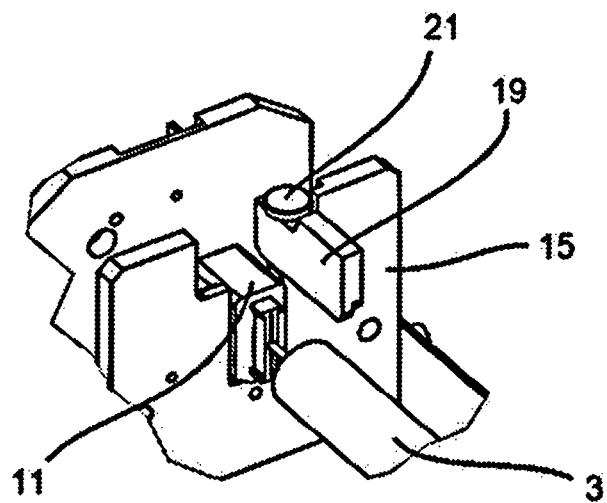
FIG. 4 is a perspective view of the ink curing apparatus of FIG. 3, showing the lamp door in an open position.
Figure 5:
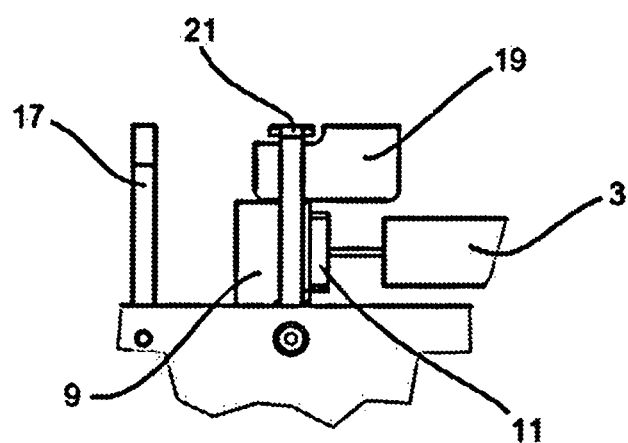
FIG. 5 is a perspective side view of the end of the ink curing apparatus shown in FIGS. 3 and 4, showing the lamp door in an open position.
Figure 6:
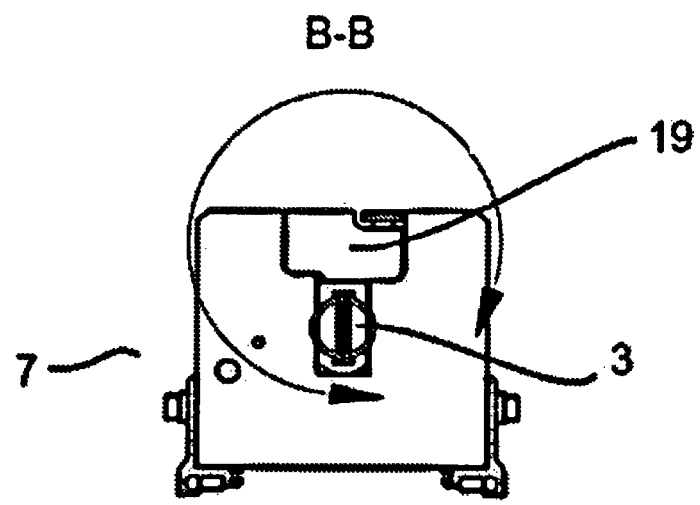
FIG. 6 is a cross-sectional view through the end of the lamp door plate of the housing of an ink curing apparatus, showing the lamp door in a closed position.
Figure 7:
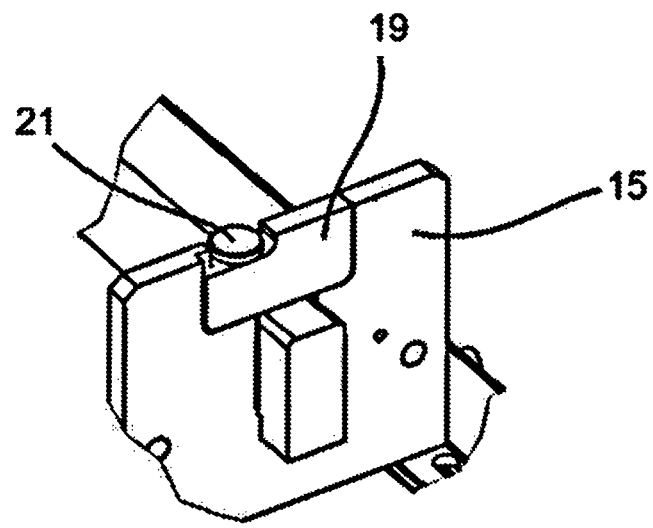
FIG. 7 is a perspective view end of the lamp door plate of the housing of an ink curing apparatus, showing the lamp door in a closed position.
Figure 8:
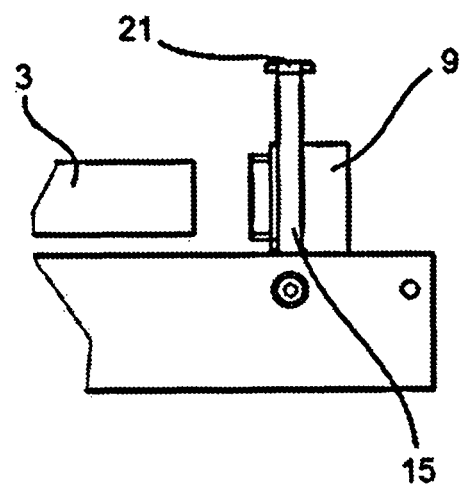
FIG. 8 is a side view of the end of the lamp housing of the ink curing apparatus.
Figure 9:
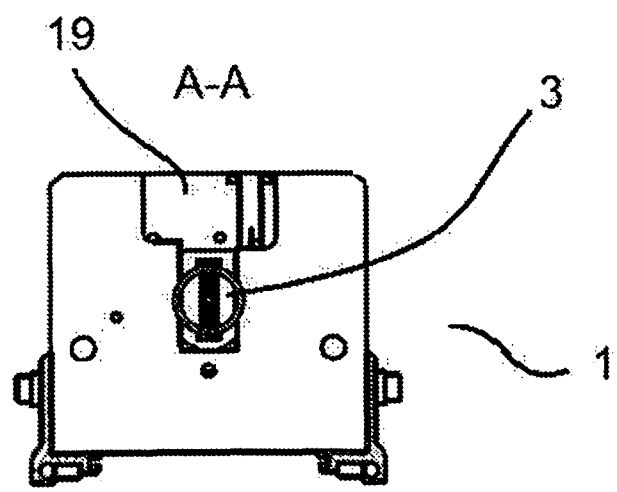
FIG. 9 is a cross sectional view through the centre of the ink curing apparatus as marked on FIG. 1 through line A-A.

Referring to FIGS. 3 to 9, each end of the lamp housing, referred to as the "lamp head" 7, is provided with a connection means in the form of a "socket" 9 for connecting and disconnecting the lamp 3 to and from the housing 1 and the power supply to which the housing 1 is connected. As shown in FIGS. 1 and 5, in use, each end of the lamp 3 has a plug 11. The plugs 11 are made of a polytetrafluoroethylene (PTFE) or a Crastin resin material. Each socket 9 in the lamp head 11 is a hollow cylindrical member configured to receive the corresponding plug 11, which protrudes from the end of the lamp 3. The plug/socket arrangement between the terminals of the lamp 3 and the housing 1 is insulated from the power supply, but when the plug and socket are connected the "push-fit" connection holds the lamp 3 in place and also allows electrical connection between the power supply and the lamp 3.

Referring to FIGS. 1, 2 and 3, an upright 13 of the lamp head 7 further comprises a "door plate" 15 parallel to the end plate 17 of the housing 1. The plug/socket connection means 9, 11 of the lamp 3 passes through the "door plate". Along the edge of the door plate 15 nearest, in use, to the curing aperture is a lamp latch 18, which secures the lamp connection means 9,11 and so the lamp 3, in place. In the closed position, shown in FIGS. 3, 6 and 7, the lamp latch 18 ensures that the lamp connection means 9, 11 cannot move in a vertical direction so that the lamp 3 is securely attached to the lamp housing 1.

Referring to FIGS. 1, 3 and 4, the lamp latch 18 comprises a lamp door 19 and a quick-release, knurled screw 21 about which the lamp door 19 is hinged. The lamp door 19 is bordered by the door plate 15 so that the major faces of the lamp door 19 are co-planar with the door plate 15. In a closed position, the lamp door 19 abuts a detent or groove in the door plate 15. The size and shape of the door plate 15 are sufficient to allow it to be stable enough to grip and move without interfering with the movement of the reflector/shutter arrangement across the curing aperture.

A shown in FIGS. 1 to 5, the lamp latch 18 is movable between a first, open position, where the lamp door 19 is parallel to the length of the housing 1 and does not obstruct or pass across the lamp plug 11, and a second, closed position, where the lamp door 19 is transverse to the length of the housing 1 and positioned across the lamp plug/socket 9, 11 so as to prevent any vertical movement of the lamp 3.

In use, when the lamp 3 is spent and needs to be removed from the housing 1, the lamp latch 18 is moved from a closed to an open position by manually unscrewing the quick-release screw 21 and lifting the lamp door 19 out of the groove in the door plate 15. This allows the lamp door 19 to be rotated about the screw 21 to an open position. The lamp plug 11 can then be unplugged from the lamp head socket 9 and the lamp 3 lifted out vertically from the housing 1. To replace the lamp, a new lamp 3 is slid vertically into the housing 1; the lamp is plugged into the socket 9 in the lamp head 7. The lamp latch 18 is then closed by rotating the lamp door 19 about the screw 21 so that the lamp door 19 slides or falls back into the detent in the door plate 15. The screw 21 is rotated to fix the lamp latch 18 into the door plate 15 and ensure that vertical movement of the lamp is restricted. If the screw 21 is not screwed secured tightly enough into the door plate 15 it is not possible to insert the lamp housing 1 into the cassette housing of the print curing apparatus prior to use because the protruding screw will prevent insertion. This ensures that the lamp 3 cannot be used without the additional security of the lamp latch 18 being closed.

The above described embodiment has been given by way of example only, and the skilled reader will naturally appreciate that many variations could be made thereto without departing from the scope of the claims. For example, in an alternative embodiment of the present invention the lamp latch could be resiliently-biased.

The invention claimed is:

1. A lamp housing for an ink curing apparatus comprising at least one lamp door configured to removably lock a lamp into the housing wherein:
   the lamp door is movable between an open position substantially parallel to the length of the housing allowing removal of the lamp and a closed position substantially transverse to the length of the housing restricting vertical movement of the lamp, and
   wherein the lamp door comprises a hinged portion rotatable about a locking pin configured such that, if the locking pin is not correctly positioned, insertion of the lamp housing into a cassette housing of a print curing apparatus is prevented.

2. A lamp housing according to claim 1 wherein the lamp door is hand-operable to move the lamp door between an open and closed position.

3. A lamp housing according to claim 1 wherein the locking pin is a threaded screw.

4. A lamp housing according to claim 3 wherein the locking pin is a knurled threaded screw.

5. A lamp housing according to claim 1 wherein the lamp door is resiliently biased.

6. A lamp housing according to claim 1 wherein the lamp door comprises a tab, which abuts an end plate of the lamp housing.

7. A lamp housing according to claim 1 wherein the tab is slideable into an end plate of the lamp housing.

8. A lamp housing according to claim 1 wherein the lamp door is provided in a door plate.

9. A lamp housing according to claim 8 wherein the door plate comprises an aperture for accommodating a plug and socket connection means of a lamp.

10. A lamp housing according to claim 8 wherein the lamp door is bordered by the door plate such that the major faces of the lamp door are co-planar with the door plate.

11. A lamp housing according to claim 8 wherein in a closed position, the lamp door abuts a detent or groove in the door plate.

12. A lamp housing according to claim 11 wherein at least part of the lamp door is slideably mounted within the groove.

13. A lamp housing according to claim 12 wherein sliding movement of the lamp door out of the door plate is restricted, preferably by a locking pin.

14. A lamp housing according to claim 13 wherein removal of the locking pin permits sliding movement of the lamp door out of the door plate.

15. A lamp housing according to claim 13 wherein the lamp door must be slid out of the groove to allow movement between a closed and an open position.

16. A lamp housing according to claim 8 wherein at least part of the lamp door rests within a groove in the door plate, said groove restricting movement of the lamp door between a closed and an open position.

17. A lamp housing according to claim 1 wherein, when the lamp door is in an open position, the lamp door is parallel to the length of the housing such that, in use, it will not obstruct or pass across a plug/socket connection means of a lamp inserted into the housing.

\* \* \* \* \*

UNITED STATES PATENT AND TRADEMARK OFFICE
CERTIFICATE OF CORRECTION

PATENT NO. : 9,050,831 B2  
APPLICATION NO. : 14/352558  
DATED : June 9, 2015  
INVENTOR(S) : Malcolm Rae and James Hicks Page 1 of 1

It is certified that error appears in the above-identified patent and that said Letters Patent is hereby corrected as shown below:

Title page

"(73) Assignee: ABERYSTWYTH UNIVERSITY,
　　　　　　　 Aberystwyeth (BG)"

should read

-- (73) Assignee: GEW (EC) LIMITED, Redhill Surrey (GB) --

Signed and Sealed this
Fifth Day of January, 2016

Michelle K. Lee
*Director of the United States Patent and Trademark Office*